United States Patent
Burbank

(10) Patent No.: US 11,630,835 B2
(45) Date of Patent: Apr. 18, 2023

(54) MODIFICATIONS OF USER DATASETS TO SUPPORT STATISTICAL RESEMBLANCE

(71) Applicant: Salesforce, Inc., San Francisco, CA (US)

(72) Inventor: Noah William Burbank, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 236 days.

(21) Appl. No.: 16/791,435

(22) Filed: Feb. 14, 2020

(65) Prior Publication Data
US 2021/0256032 A1   Aug. 19, 2021

(51) Int. Cl.
*G06F 16/25* (2019.01)
*G06N 20/00* (2019.01)
*G06F 16/2458* (2019.01)
*G06F 17/18* (2006.01)

(52) U.S. Cl.
CPC ........ *G06F 16/258* (2019.01); *G06F 16/2462* (2019.01); *G06F 17/18* (2013.01); *G06N 20/00* (2019.01)

(58) Field of Classification Search
CPC ...... G06F 16/25; G06F 16/2458; G06F 17/18; G06F 16/906
See application file for complete search history.

(56) References Cited

U.S. PATENT DOCUMENTS

| | | | | |
|---|---|---|---|---|
| 6,034,925 | A * | 3/2000 | Wehmeyer | H04N 21/8352 369/30.28 |
| 10,395,640 | B1 * | 8/2019 | Beach | G10L 15/01 |
| 2002/0147628 | A1 * | 10/2002 | Specter | G06Q 30/0241 705/26.7 |
| 2006/0116920 | A1 * | 6/2006 | Shan | G06Q 10/04 705/7.11 |
| 2010/0207812 | A1 * | 8/2010 | Demirdjian | G06Q 30/08 705/1.1 |
| 2011/0202567 | A1 * | 8/2011 | Bach | G06F 16/639 707/784 |
| 2013/0317886 | A1 * | 11/2013 | Kiran | G06Q 30/0202 705/7.31 |
| 2017/0177809 | A1 * | 6/2017 | Bull | G16H 10/20 |
| 2018/0131582 | A1 * | 5/2018 | Schnitzer | H04L 12/2869 |

(Continued)

*Primary Examiner* — Aleksandr Kerzhner
*Assistant Examiner* — Maher N Algibhah
(74) *Attorney, Agent, or Firm* — Holland & Hart, LLP

(57) ABSTRACT

A method, apparatus, and system for modifying user datasets to support statistical resemblance is described. To support modifying user datasets to support statistical resemblance, an application may generate a first profile from a first corpus that includes first user data, generate a set of modified profiles from a second profile from a second corpus including second user data, wherein the first profile and the set of modified profiles includes respective sets of first and second attributes corresponding to one or both of text or metadata associated with the respective first and second user data, determine a mathematical distance between the first profile and each modified profile of the set of modified profiles based at least in part on a comparison between the first set of attributes and the second set of attributes, and finally, select a modified profile having a smallest determined mathematical distance.

20 Claims, 11 Drawing Sheets

(56) References Cited

U.S. PATENT DOCUMENTS

| | | | | |
|---|---|---|---|---|
| 2018/0329980 A1* | 11/2018 | Ebrahim | ............... | G06F 16/25 |
| 2019/0361849 A1* | 11/2019 | Rogynskyy | ......... | G06F 16/2365 |
| 2019/0361861 A1* | 11/2019 | Rogynskyy | ........... | G06F 16/122 |
| 2020/0379974 A1* | 12/2020 | Stennett | ............. | G06F 16/2228 |
| 2021/0149896 A1* | 5/2021 | Yu | ...................... | G06V 30/412 |

\* cited by examiner

MODIFICATIONS OF USER DATASETS TO SUPPORT STATISTICAL RESEMBLANCE

FIELD OF TECHNOLOGY

The present disclosure relates generally to database systems and data processing, and more specifically to modifications of user datasets to support statistical resemblance.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support use of machine learning techniques to gain insight from data stored or processed by the cloud platform. For example, user communications such as emails may be analyzed using machine learning techniques. Some machine learning models may involve the use of personally sensitive data for accurate training and validation. However, access to personally sensitive data may be restricted for legal or technical reasons, which may inhibit the ability to train or validate some machine learning models. In some cases, publicly available data may be used for model training. However, if the publicly available data is different from the data that the machine learning model is designed to assess, then the machine learning model may produce inaccurate results.

DETAILED DESCRIPTION

Figure 1:
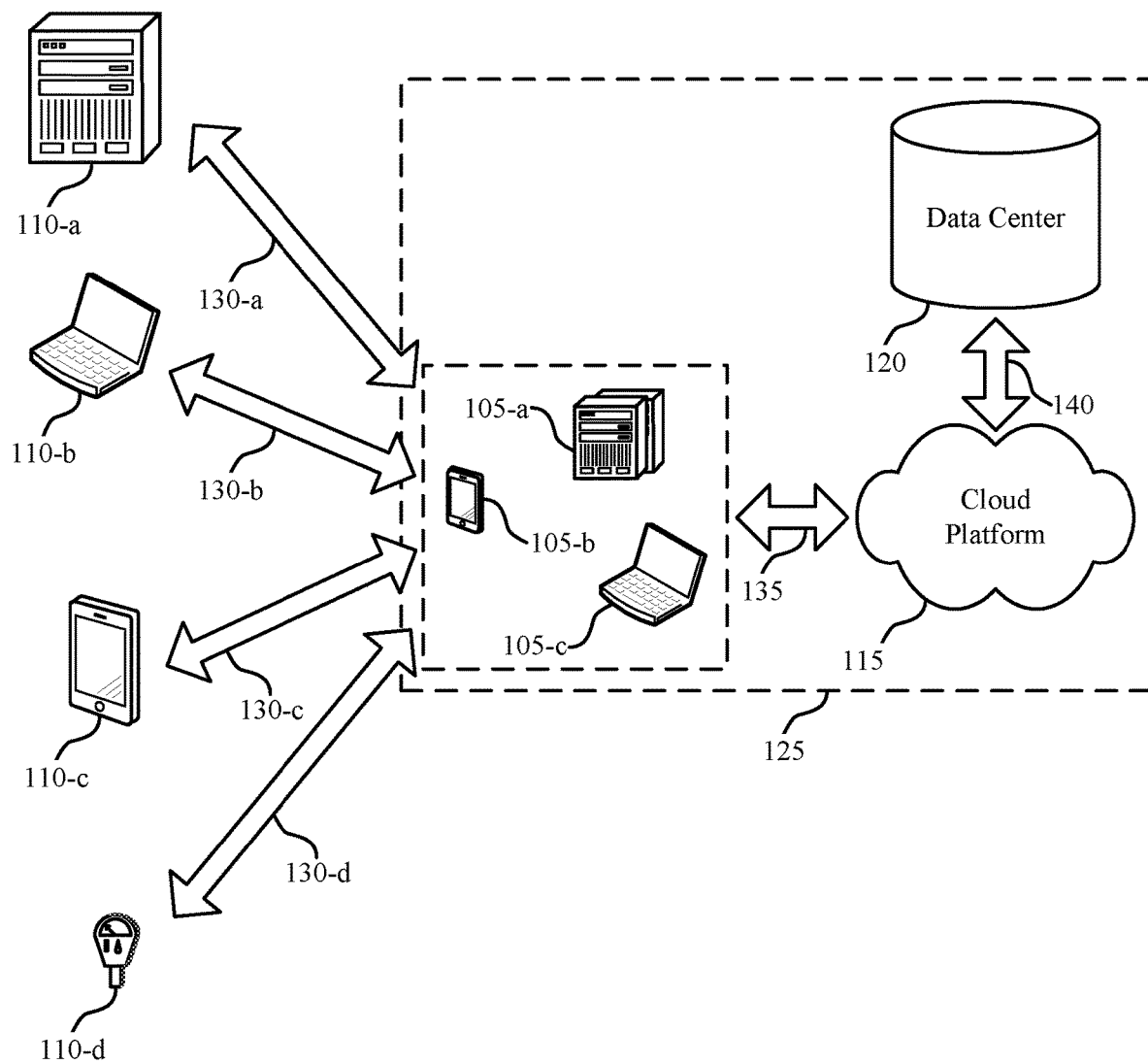
FIG. 1 illustrates an example of a system for that supports modifications of user datasets to support statistical resemblance in accordance with aspects of the present disclosure.

A cloud platform may support use of machine learning techniques to analyze data stored or processed by the cloud platform. For example, a cloud platform may have access to user communications (e.g., emails), and a machine learning model may be trained to identify and extract information from the user communications (e.g., contact information of participants to the email). To build and train a machine learning model that is capable of extracting information from user communications, a corpus of training data is needed that statistically resembles the user communications. For example, if a machine learning model is being trained to extract contact information from emails associated with a sales organization, then a corpus of similar emails may be needed so that the machine learning model can train on relevant data.

In some cases, a corpus of training data may contain types of information that are protected or otherwise inaccessible (e.g., personally identifiable information (PII) or other information associated with security concerns) by technical, legal, or business restrictions. However, some types of machine learning models (e.g., a model that extracts contact information or other types of PII) may require access to the protected information for accurate model training and validation. In such cases, instead of using a corpus of data that contains protected information (e.g., customer emails), a machine learning model may train on publicly available data that contains non-restricted PII (e.g., a publicly available email corpus).

However, in some cases, publicly available data may vary from the target data to a statistical degree that renders the publicly available data unusable for machine learning techniques (e.g., because models created from the publicly available data may be inaccurate). For example, in the case of emails, if the publicly available corpus contains emails that are several years older than the target emails, the publicly available emails may omit terminology that is present in the target emails. The publicly available emails may also differ from the target emails in a variety of other ways such that the publicly available emails may not statistically resemble the target emails.

In accordance with aspects of the present disclosure, techniques are described to modify a corpus (e.g., publicly available emails) to statistically resemble another corpus (e.g., a target set of user emails) so that the modified corpus can be used for accurate machine learning training and validation. Such techniques facilitate the development of machine learning models (or other types of mathematical models) that rely on certain types of data (e.g., protected PII), without the need to access the underlying protected data.

The described techniques include characterizing a corpus of data to generate a profile. For example, a corpus of user communications may be characterized by one or more attributes to generate a profile that is representative of that corpus. In the case of emails containing PII, the use of a profile to characterize the data may provide a mechanism of characterizing the emails (e.g., for comparison to other emails) without having to access or reveal the underlying PII. A corpus of publicly available data may similarly be characterized by a profile using one or more attributes of the data from the corpus. In this way, the profile of a first corpus (e.g., a corpus of user communications) may be compared to the profile of a second corpus (e.g., a corpus of publicly available communications), and the comparison may be measured using one or more statistical techniques. Profiling a corpus in this way may be similar to producing a summary statistic representative of a corpus that maps the corpus into a point in a multidimensional space in which distance measurements can be made between points.

A corpus may then be modified (e.g., the underlying data may be changed in a way that affects an attribute of the data) such that the profile of that corpus changes. The described techniques include methods for changing a corpus (e.g., using parameterized techniques and/or distributed computing) and measuring a similarity between a modified profile of the modified corpus and a profile of a target corpus. The process of modifying and comparing corpus profiles may be characterized as a minimization process, such that the process is parameterized and iterates until a modified corpus is identified that is within a threshold of statistical resemblance of the target corpus profile.

Once a modified profile is identified as being statistically similar to a target profile, then the modified corpus associated with the selected modified profile may be used for machine learning techniques, as described herein.

Aspects of the disclosure are initially described in the context of an environment supporting an on-demand database service. Additional aspects are described with reference to a database system and a profile modification graph that supports modifications of user datasets to support statistical resemblance. Aspects of the disclosure are further illustrated by and described with reference to apparatus diagrams, system diagrams, and flowcharts that relate to modifications of user datasets to support statistical resemblance.

FIG. 1 illustrates an example of a system 100 for cloud computing that supports modifications of user datasets to support statistical resemblance in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Techniques are described herein for modifications of user datasets to support statistical resemblance. The techniques may provide for characterizing a corpus of user or customer data to generate a profile. The corpus may include user communications or other information that may be characterized by one or more attributes to generate a profile that is representative of that corpus. In some examples, the corpus of data may include PII or other information associated with security or privacy concerns, and the generated profile may facilitate characterization of the data without implicating the privacy or security concerns. The generated profile may be compared to a profile generated from a second corpus including publicly available data that is not associated with privacy or security concerns. The profile generated from the second corpus of data may then be iteratively modified to more closely mimic or imitate the profile generated from the first corpus until a threshold of statistical resemblance to the profile generated from the first corpus is achieved. The resulting modified corpus from the modified profile may then be used for machine learning techniques, as described herein.

The cloud platform 115 may support use of machine learning techniques to analyze data stored or process by the cloud platform 115. For example, the cloud platform 115 may have access to user communications (e.g., emails), and a machine learning model may be trained to identify and extract information from the user communications (e.g., contact information of participants to the email). As described herein, the system 100 may build and train a machine learning model that is capable of extracting information from user communications using a corpus of training data that statistically resembles the user communications that include data associated with privacy or security concerns that inhibits the use of the user communications for training the machine learning model as the communications may not be stored, viewed, or otherwise maintained on a user system. In such cases, instead of using a corpus of data that contains protected information (e.g., customer emails), a machine learning model may train on publicly available data that contains non-restricted PII (e.g., a publicly available email corpus). In accordance with aspects of the present disclosure, the system 100 may modify a publicly available corpus to statistically resemble a non-publicly available corpus so that the modified corpus can be used for accurate machine learning training and validation. Such techniques facilitate the development of machine learning models (or other types of mathematical models) that rely on certain types of user data that may be associated with privacy or security concerns, without the need to access the underlying protected data.

The system 100 may support modifications of publicly available user datasets that do not contain data associated with privacy or security concerns to support statistical resemblance between the modified publicly available user datasets and a non-publicly available dataset or a dataset that includes data associated with security or privacy concerns. For example, a corpus of user communications may be characterized, by the system 100, by one or more attributes to generate a profile that is representative of that corpus. A corpus of publicly available data may similarly be characterized, also by the system 100, by a profile using one or more attributes of the data from the corpus. The system 100 may also modify the second corpus of data such that the profile of that corpus changes. Once a modified profile is identified as being statistically similar (e.g., within a certain mathematical distance or distance within a vector space) to a target profile by the system 100, then the modified corpus associated with the selected modified profile may be used for machine learning techniques, as described herein.

By implementing modifications of publicly available user datasets that do not contain data associated with privacy or security concerns in order to support statistical resemblance of the publicly available user dataset with a user dataset that is not publicly or otherwise available so that the modified publicly available user dataset may be used for machine learning techniques, the user experience and success rate of training a machine learning system to analyze and respond to user data may improve by more efficiently and effectively modifying the publicly available user datasets to more closely mimic the desired user dataset.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
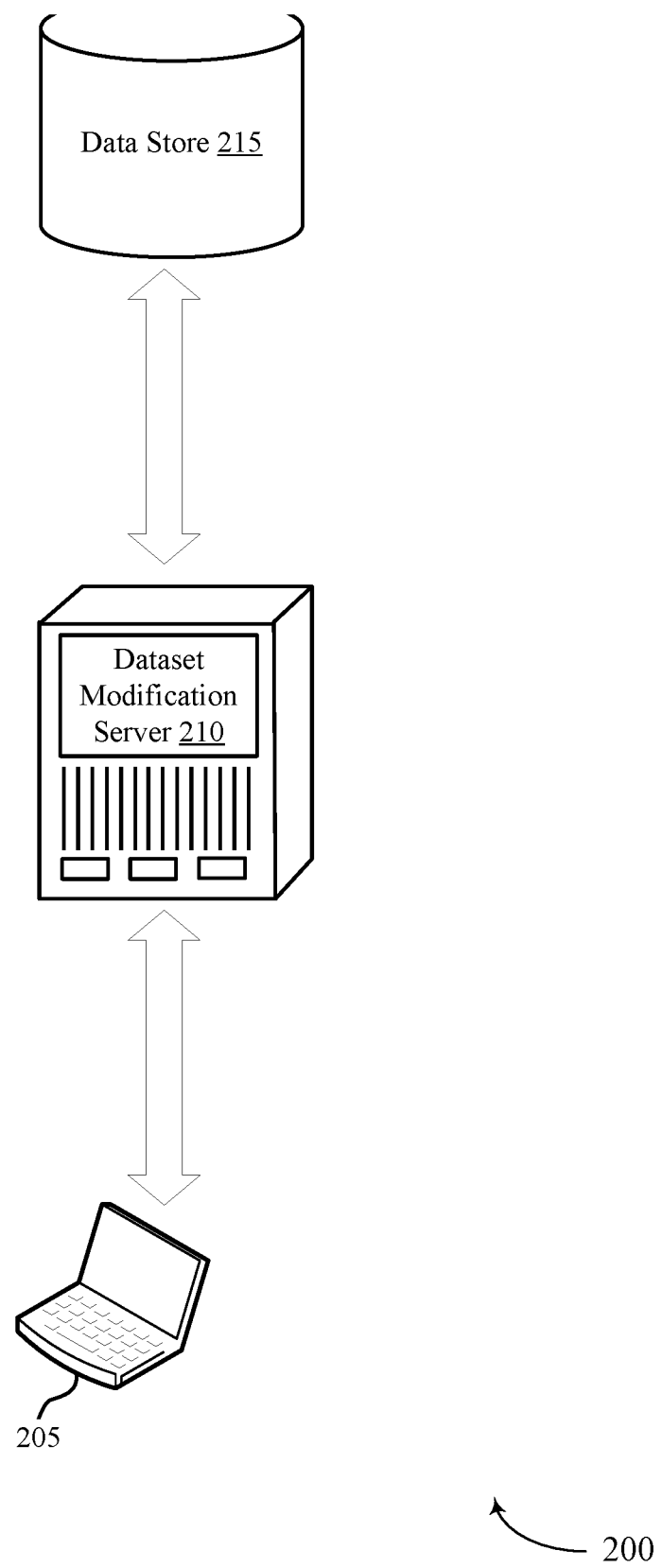
FIG. 2 illustrates an example of a system that supports modifications of user datasets to support statistical resemblance in accordance with aspects of the present disclosure.

FIG. 2 illustrates an example of a system 200 that supports modifications of user datasets to support statistical resemblance in accordance with aspects of the present disclosure. The system 200, which may be an example of a system for data processing, includes a user device 205, a data modification server 210, and a data store 215. The system 200 may implement aspects of the system 100 as described with reference to FIG. 1 to support use of machine learning techniques to gain insight from data stored or processed by a cloud platform, for example, the cloud platform 115. For example, the data modification server 210 may be an example of a single server, a server cluster, a database server, a cloud-based server, a virtual machine, a container, or any other device or system that supports data processing. Additionally, the user device 205 may be an example of cloud clients 105 or contacts 110, and the data store 215 may implement aspects of one or more of the data center 120 or cloud platform 115 as described with reference to FIG. 1, for example.

The data modification server 210 may be an example of an analytics platform for analyzing and modifying user datasets for creating and modifying profiles associated with the user datasets, for determining relative closeness of the created and/or modified profiles, and may leverage machine learning techniques. The data modification server 210 may be in communication with the data store 215 and may receive one or more corpora including user datasets. In some examples, the data store 215 may include multiple and disparate data stores 215 located on or apart from a local network connection shared with the data modification server 210. The user device 205 may be in communication with the data modification server 210 and may store and transmit data related to the datasets analyzation and modification processes and may leverage machine learning techniques. The user device 205 may additionally present information related to the data analyzation and modification processes described herein via a user interface and may solicit input from the user regarding creation, iteration, and maintenance of data analyzation and modification processes to support statistical resemblance and use of machine learning techniques to further analyze the data.

In some cases, the analytics application server 215 may be utilized to modify a dataset to mimic a customer dataset such that the modified dataset may be used to support machine learning techniques to gain insight from the customer dataset without implicating security or privacy concerns that may be associated with the storage, viewing, access, modification, or use of the customer data. For example, the customer dataset may include PII or other sensitive information that would violate regulatory or legal requirements if it was to be modified, accessed, or stored. However, publicly available datasets that are devoid of PII or other sensitive/private information may be sufficiently dissimilar from the desired customer dataset to complicate or prohibit use of the public dataset for machine learning techniques aiming to gain insight from the desired customer dataset.

To facilitate access to relevant and useful datasets by the machine learning portions of the system 200, the analytics application server 215 may generate a first profile from a first corpus, the first corpus containing the desired customer dataset. As described herein, the analytics application server 215 may generate the first profile securely such that generation of the first profile yields one or more metrics corresponding to the data contained within the customer dataset but that are not associated with privacy or security concerns. In some examples, the first profile may include several metrics as well as commonly occurring (within the customer dataset) state transitions and the probabilities associated with the state transitions. Accordingly, the analytics application server 215 may generate the profile by using the customer dataset in aggregate to create an unsupervised model.

The analytics application server 215 may also generate a profile corresponding to the publicly available dataset and one or more modified profiles using the open source/training/publicly available dataset to facilitate modeling of the desired customer dataset using the publicly available dataset instead of the customer dataset itself. The generated one or more modified profiles may, as with the first profile, include one or more metrics corresponding to the data contained within the publicly available dataset as well as commonly occurring (within the publicly available customer dataset) state transitions and the probabilities associated with the state transitions. However, the metrics and state transitions of the publicly available dataset may not directly correspond to the metrics and state transitions of the customer dataset, and so the generated modified one or more profiles may not correlate directly or in a useful manner to the first profile generated from the customer dataset.

In some examples, to facilitate generation of a profile based on the publicly available dataset including email communications that is more statistically similar to the first profile of the customer dataset including email communications, a simple heuristic version of a machine learning model that is intended to be built may be used to help with characterization or profile generation of a corpus. For example, a heuristic signature parser may be used by the analytics application server 215. In some examples, the heuristic signature parser may be configured to identify commonly used expressions, word lists, and rules, among other metrics. In this example, use of the heuristic signature parser may facilitate modifying lines of the email signature within a communication of the publicly available dataset and translating them into a sequence of state transitions. In some cases, to generate a profile that may be generated from unknown inputs by utilizing sequential information within the communications, a sequential machine learning model may be used. In some cases, a Conditional Random Fields (CRF) or a Hidden Markov Model (HMM) machine learning model may be used to generate the profile for the publicly available dataset. In some examples, the generated profile may include a distribution of the most frequently occurring (within the publicly available dataset) state transitions. In some examples, as illustrated below for state transitions of addresses within the signature of emails, collapsing transitions to maintain a current state of the profile may improve quality of the results:

val input: List[String]=List("1600", "Pennsylvania", "Ave", "NW", "Washington", "DC", "20500")
    val rawTags: List[Tag]=List(HouseNo, Street, Street, Street, City, State, Zipcode)
    val collapsedTags: List[Tag]=List(HouseNo, Street, City, State, Zipcode)

Based on the above example of the heuristic signature parser applied to a publicly available dataset including one or more communications including addresses, the following profile may be generated:

35% HOUSE_NO—STREET
    19% HOUSE_NO—STREET—CITY—STATE—ZIP_CODE—COUNTRY
    5% COUNTRY
    5% HOUSE_NO—CITY—STREET
    3% HOUSE_NO—STREET—SUITE—CITY—STATE—ZIP_CODE—COUNTRY
    2% HOUSE_NO—STREET—CITY—STREET
    2% HOUSE_NO—STATE—STREET
    1% SUITE—HOUSE_NO—STREET—CITY—STATE—ZIP_CODE—COUNTRY

To facilitate modifying the publicly available dataset to more closely imitate the desired customer dataset, a determination of the relative closeness of the two datasets may be determined. In some cases, the relative closeness of the two datasets may be a measurement of a mathematical distance between the two datasets. In some cases, the measurement of the mathematical distance between the two datasets may be a measurement of a mathematical distance between a profile of the publicly available dataset and a profile of the desired customer dataset. In some cases, determination of the mathematical distance may be based on an asymmetrical score. In additional cases, an equation such as the following equation, may be used to determine the mathematical distance between a profile of the publicly available dataset and the desired customer dataset.

$$\sum_{i=1}^{n} p(i|customerProfile) * (1 - |p(i|customerProfile) - p(i|modifiedOSProfile|))$$

Equation 1

The analytics application server 215 may utilize "mild" destructive filtering on the publicly available dataset in order to modify the publicly available dataset to generate a modified dataset that more closely imitates the desired customer dataset. For example, in examples involving addresses from user communications, the analytics application server 215 may determine if each address fits a common pattern (i.e., is parameterized) within the customer data. If the address does fit one of the common patterns (e.g., a pattern with an occurrence above a threshold in the customer dataset), it is retained within the publicly available dataset. In this way, a subset of the data from the publicly available corpus may be retained in its original form, rather than being modified in some way, as described below. If the address does not fit one of the common patterns, the analytics application server 215 may remove one or more combinations of the parameters of commonly occurring addresses and then sample from each of the valid resulting sequences according to the distribution of those sequences within the desired customer dataset. For example, the following is an example of an address (the White House):

List("1600", "Pennsylvania", "Ave", "NW", "Washington", "DC", "20500")

The above address yields the following collapsed tag pattern:

List(HouseNo, Street, City, State, ZipCode)

Accordingly, if the above collapsed tag pattern is a top pattern within the generated customer profile, the pattern may be retained by the analytics application server 215. Another example of an address is included below:

List("1600", "Pennsylvania", "Ave", "NW", "Washington", "DC", "20500", "USA")

The above address yields the following collapsed tag pattern:

List(HouseNo, Street, Suite, City, State, ZipCode, Country)

However, inclusion of a country code within an address block of a user communication may not be common practice, so the above collapsed tag pattern may not be a common pattern within the generated customer profile. Accordingly, each variation of potential collapsed tag patterns corresponding to the generated customer profile that removes one or more elements/metrics may be expanded and used as part of the modification process of the publicly available dataset. Included below is a list of potential example address patterns:

List("Pennsylvania",|"Ave", "NW", "Suite", "2A", "Washington", "DC", "20500", "USA")
List("1600", "Ave", "NW", "Suite", "2A", "Washington", "DC", "20500", "USA")
List("1600", "Pennsylvania", "NW", "Suite", "2A", "Washington", "DC", "20500", "USA")

To facilitate identification of the portions of the publicly available dataset that require modification to increase similarity between the publicly available dataset and the desired customer dataset, each of the above variations of address patterns may be represented by a corresponding collapsed tag sequence. The analytics application server 215 may remove invalid state transitions and randomly select a pattern based on its frequency within the profile of the desired customer dataset. In some examples, this may yield an imbalance biased towards shorter sequences and so the resulting modified dataset may be upsampled or downsampled to reduce the imbalance.

The process described herein for modifying the publicly available dataset to yield a profile that is more similar to a profile associated with a desired customer dataset may be repeated iteratively to yield a modified publicly available dataset that is within a similarity threshold associated with a level of similarity to the desired customer dataset and therefore a dataset that may be used to support the machine learning techniques described herein.

The above example of profile generation, profile comparison, and corpus modification is provided for illustrative purposes, and it should be understood that other techniques for profile generation, profile comparison, and corpus modification are supported by the present disclosure. For example, although a corpus of user communications was provided as an example, the techniques described herein may be applied to any corpus of data. Furthermore, a corpus may be characterized by a profile using a variety of parameters in addition to or other than the statistical occurrence of sequence state transitions within the dataset. Furthermore, a corpus may be modified by filtering, destructive modification, or the implementation of a generative function created from the customer corpus using vocabulary from the open source corpus, for example by using the customer's state transitions to simulate a corpus with the open source vocabulary.

Figure 3:
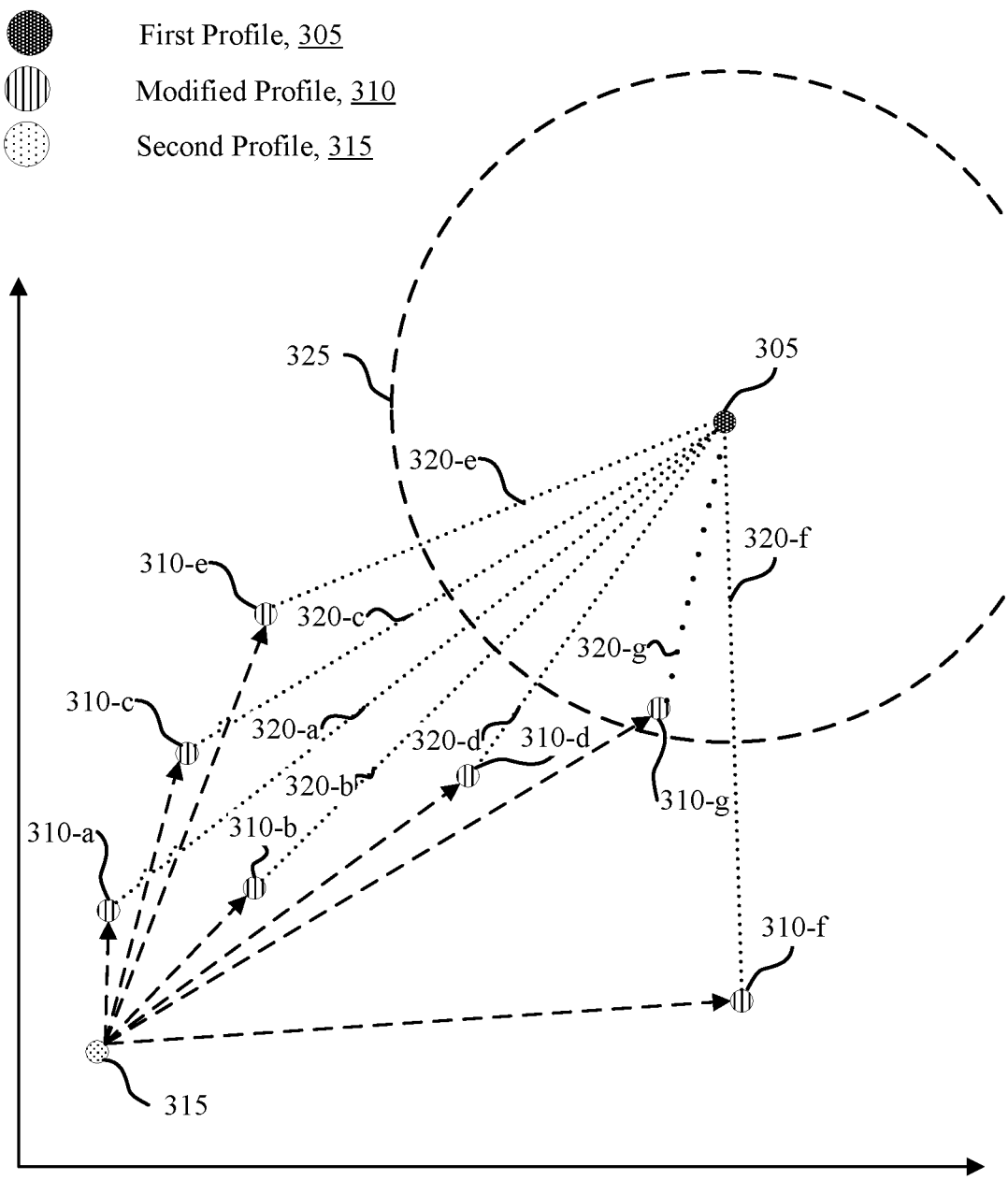
FIG. 3 illustrates an example of a profile modification graph that supports modifications of user datasets to support statistical resemblance in accordance with aspects of the present disclosure.

FIG. 3 illustrates an example of a profile modification graph 300 that supports modifications of user datasets to support statistical resemblance in accordance with aspects of the present disclosure. As depicted with reference to FIG. 3, the graph 300 may illustrate a plot including a first profile 305, a number of modified profiles 310, a second profile 315, and a similarity threshold 325. The profile modification graph 300 illustrates relative closeness of each of the first profile 305, the modified profiles 310, and the second profile 315. As described with reference to FIGS. 1 and 2, a device (e.g., a user device, server, server cluster, database, the cloud platform 115, or the data modification server 210, etc.) may perform modifications to a corpus (e.g., publicly available user data including, emails, communications, etc.) in an iterative process to cause a change in a profile that may be generated by the device based on the corpus in an attempt to yield a profile that most closely imitates a desired dataset profile.

With reference to FIG. 3, the profile modification graph 300 illustrates the results of the iterative corpus (and therefore, profile) modification process described herein. More specifically, the profile modification graph 300 illustrates the positions of the modified profiles 310 relative to both of the first profile 305 and the second profile 315. The first profile 305 represents a profile generated from a first corpus including user data that may be associated with privacy or security concerns, and is therefore unavailable for direct manipulation or storage as part of the machine learning process described herein. The second profile 315 represents a profile generated from a second, publicly available corpus available for manipulation, handling, and storage without privacy or security concerns.

For example, a modified profile 310-a is illustrated as being closest of all of the modified profiles 310 to the second profile 315 and furthest of all of the modified profiles 310 from the first profile 305. A distance 320-a represents a straight-line distance between the modified profile 310-a and the first profile 305 in the 2-dimensional plane represented by the profile modification graph 300. Each of the modified profiles 310 is plotted at respective distances 320 from the first profile 305, each distance 320 representative of a statistical similarity between a respective one of the modified profiles 310 and the first profile 305. In some cases, the statistical similarity may be a mathematical distance and may include a Manhattan distance, a Euclidean distance, a harmonic mean of a minimum distance, a probability weighed expected distance, or a combination thereof.

With continued reference to FIG. 3, a modified profile 310-b is plotted a distance 320-b from the first profile 305, a modified profile 310-c is plotted a distance 320-c from the first profile 305, a modified profile 310-d is plotted a distance 320-d from the first profile 305, a modified profile 310-e is plotted a distance 320-e from the first profile 305, and a modified profile 310-f is plotted a distance 320-f from the first profile 305. A modified profile 310-g is plotted a distance 320-g from the first profile 305, the distance 320-g being the smallest distance 320 associated with the modified profiles 310. Accordingly, the modified profile 310-g is positioned closest to the first profile 305 and within the similarity threshold 325, indicating that the modified profile 310-g is the most statistically similar of the modified profiles 310 and is sufficiently similar to the first profile 305 to imitate the first profile 305 and facilitate use of the modified profile 310 by a machine learning process as described herein. In some cases, the similarity threshold 325 may be input by a user. In some cases, the similarity threshold 325 may be determined through a statistical analysis process that determines within a predetermined confidence interval whether modified profiles 320 falling within the similarity threshold 325 are sufficiently similar to the first profile 305.

Figure 4:
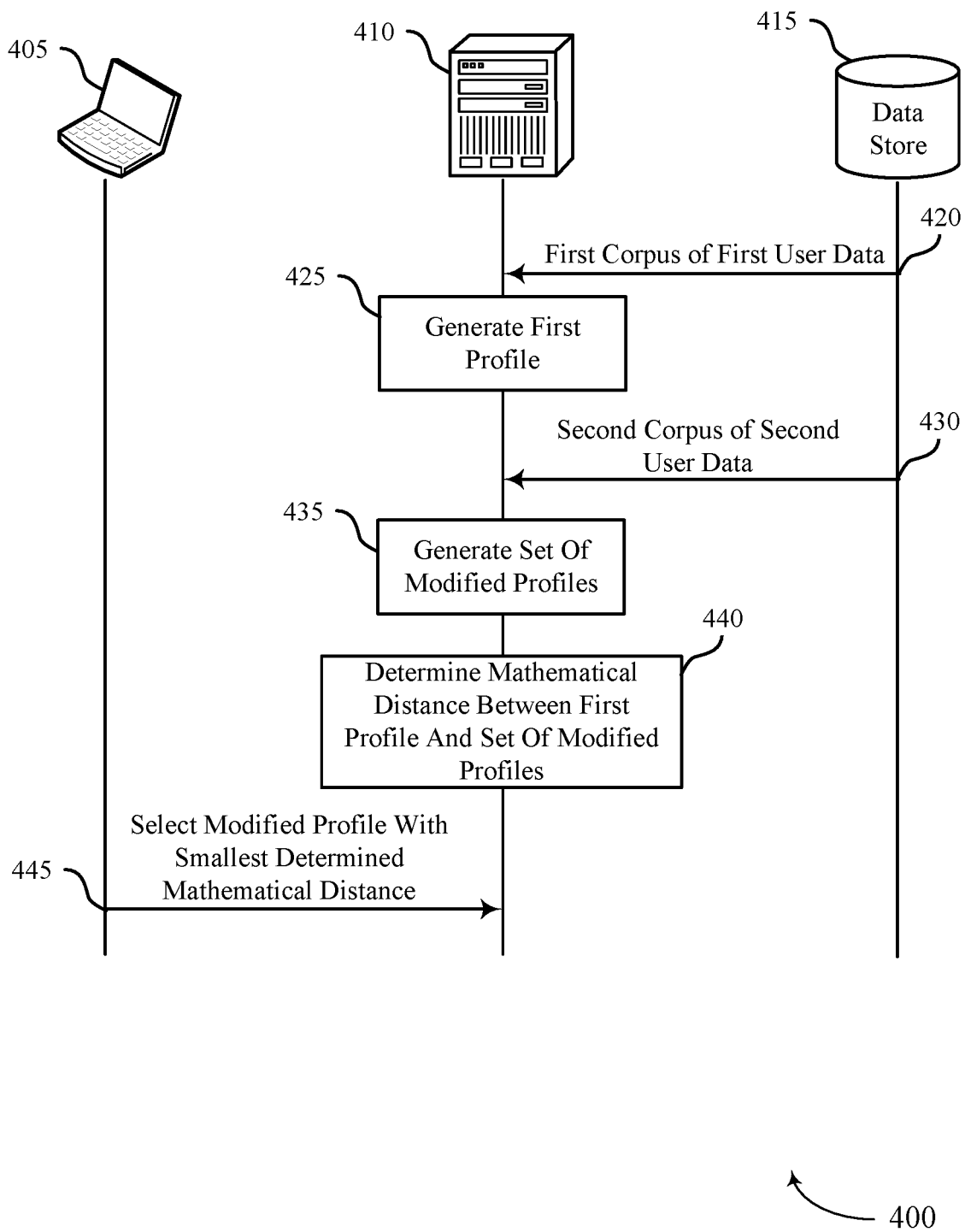
FIG. 4 illustrates an example of a process flow that supports modifications of user datasets to support statistical resemblance in accordance with aspects of the present disclosure.

FIG. 4 illustrates an example of a process flow 400 that supports modifications of user datasets to support statistical resemblance in accordance with aspects of the present disclosure. The process flow 400 includes a user device 405, a datasets modification server 410, and a data store 415. These may be examples of the corresponding devices described with reference to FIGS. 1 through 3. Alternative examples of the following may be implemented, where some steps are performed in a different order than described, or not performed at all. In some cases, steps may include additional features not mentioned below, or further steps may be added.

At 420, the dataset modification server 410 may receive a first corpus of first user data. In some examples, the dataset modification server 410 may receive the first corpus of first user data securely, that is, the first corpus of first user data may be protected such that a user interacting with the first corpus, or an indication of the first corpus, is prevented from viewing, accessing, storing, or otherwise interacting with portions of the first corpus that contain information associated with privacy or security concerns. In some cases, the dataset modification server 410 may receive an indication of the first corpus from the data store 415. In such cases, the portions of the first corpus that contain the information associated with the privacy or security concerns may have been replaced in the indication of the first corpus with surrogate information not associated with privacy or security concerns, or with some other type of placeholder information that is not identifiable with the removed portions of the first corpus.

At 425, the dataset modification server 410 may generate a first profile from the first corpus including the first user data. In some examples, the first user data may include one or more of data logs, customer relationship management data, contact data, customer data, emails, calendar events, service tickets, short message service (SMS) text messages, voice calls, social media messages, or a combination thereof. In some cases, the first user data may include data associated with a customer or the user. As described herein, the first user data may include data associated with security and/or privacy concerns, and the dataset modification server 410 may interact with the first user data to generate the first profile without compromising security or privacy concerns which may be associated with the first user data.

In some cases, generating the first profile, by the dataset modification server 410 may include identifying a group of text from each first user data of the first user data and generating a set of sequences of state transitions associated with the groups of text. In such cases, the dataset modification server 410 may further generate a set of collapsed sequences by combining duplicate state transitions from each sequence of the set of sequences.

At 430, the dataset modification server 410 may receive a second corpus of second user data. In some examples, the dataset modification server 410 may receive the second corpus of second user data in a format that facilitates storage and modification of the second corpus including the second user data. In some cases, the second user data of the second corpus may include one or more of data logs, customer relationship management data, contact data, customer data, emails, calendar events, service tickets, short message service (SMS) text messages, voice calls, social media messages, or a combination thereof.

At 435, the dataset modification server 410 may generate a set of modified profiles from a second profile from the second corpus including the second user data. The first profile and the set of modified profiles may include respective sets of first and second attributes corresponding to one or both of text or metadata associated with the respective first and second user data. In some cases, the first profile and the set of modified profiles may include a distribution of occurrences of the respective first set of attributes and the second set of attributes. In such cases, the respective first set of attributes and second set of attributes may include a sequence of state transitions, a distribution of lengths of a number of text communications, a frequency of an occurrence of one or more text combinations or metadata, or a combination thereof.

In some cases, to generate the set of modified profiles, the dataset modification server 410 may further identify a subset of attribute patterns from the second user data having matching attribute patterns in the first profile and retain the subset of attribute patterns unchanged in the set of modified profiles based at least in part on identifying the subset of attribute patterns.

In some cases, the dataset modification server 410 may modify the second corpus to generate the set of modified profiles. In some such cases, modifying the second corpus may include one or more of upsampling of the second user data, downsampling of the second user data, dropping elements from the second user data, removing elements from the second user data, generating a vocabulary from the second user data, generating one or more models from the second user data, or a combination thereof.

In some cases, the dataset modification server 410 may generate a set of modified attributes for a remaining subset of attribute patterns by modifying at least one attribute of the number of second attributes and then may randomly sample from the set of modified attributes according to a distribution of occurrence of the set of modified attributes in the first profile.

At 440, the dataset modification server 410 may determine a mathematical distance between the first profile and each modified profile of the set of modified profiles based at least in part on a comparison between the first set of attributes and the second set of attributes. In some cases, the comparison between the first set of attributes and the second set of attributes is based at least in part on a probability weighted difference between occurrences of the first set of attributes in the first profile and occurrences of the second set of attributes in each modified profile of the set of modified profiles. In some cases, the determined mathematical distance may include a Manhattan distance, a Euclidean distance, a harmonic mean of a minimum distance, or a combination thereof.

Figure 5:
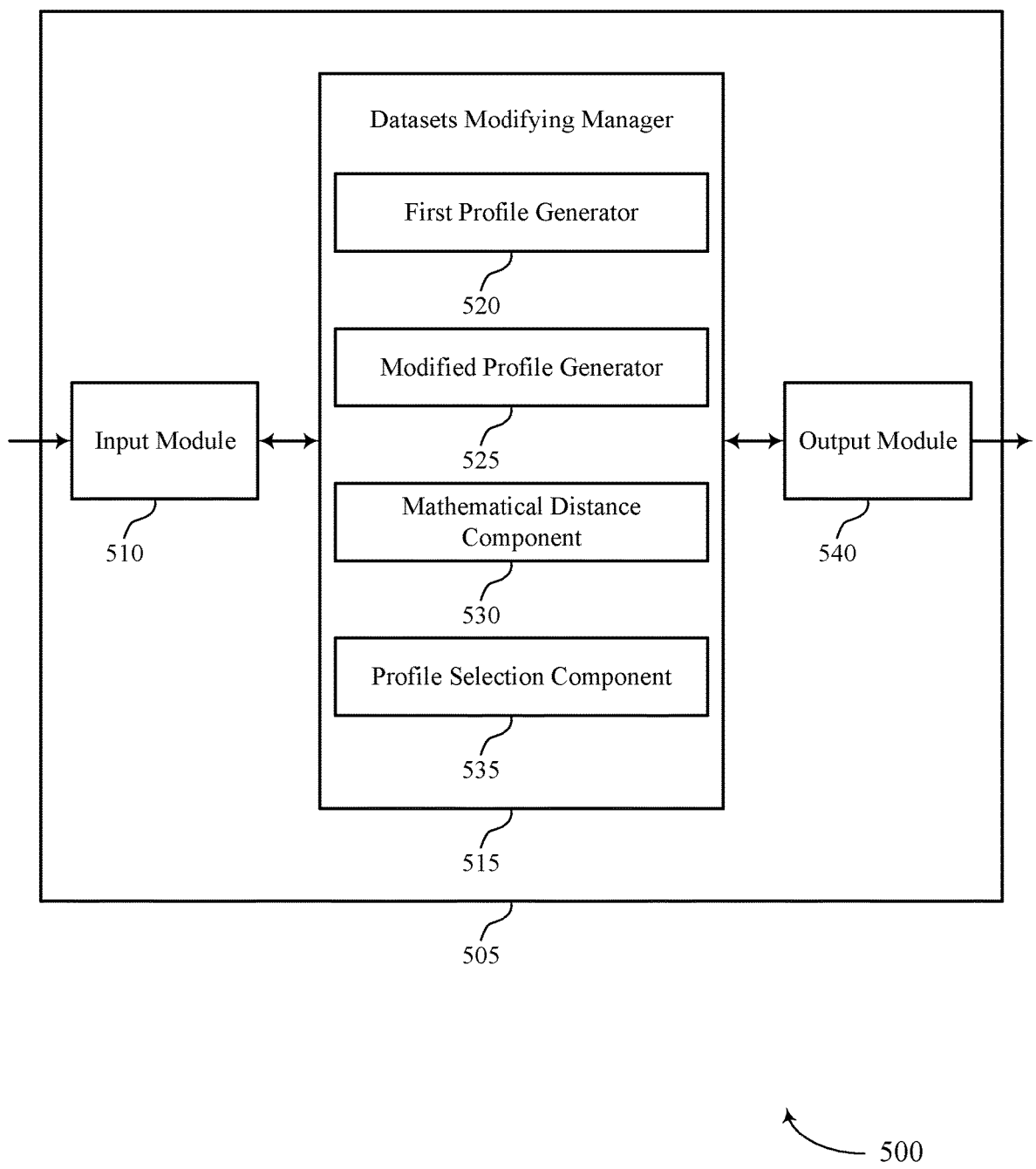
FIG. 5 shows a block diagram of an apparatus that supports modifications of user datasets to support statistical resemblance in accordance with aspects of the present disclosure.

FIG. 5 shows a block diagram 500 of an apparatus 505 that supports modifications of user datasets to support statistical resemblance in accordance with aspects of the present disclosure. The apparatus 505 may include an input module 510, a datasets modifying manager 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the datasets modifying manager 515 to support modifications of user datasets to support statistical resemblance. In some cases, the input module 510 may be a component of an input/output (I/O) controller 715 as described with reference to FIG. 7.

The datasets modifying manager 515 may include a first profile generator 520, a modified profile generator 525, a mathematical distance component 530, and a profile selection component 535. The datasets modifying manager 515 may be an example of aspects of the datasets modifying manager 605 or 710 described with reference to FIGS. 6 and 7.

The datasets modifying manager 515 and/or at least some of its various sub-components may be implemented in hardware, software executed by a processor, firmware, or any combination thereof. If implemented in software executed by a processor, the functions of the datasets modifying manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The datasets modifying manager 515 and/or at least some of its various sub-components may be physically located at various positions, including being distributed such that portions of functions are implemented at different physical locations by one or more physical devices. In some examples, the datasets modifying manager 515 and/or at least some of its various sub-components may be a separate and distinct component in accordance with various aspects of the present disclosure. In other examples, the datasets modifying manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The first profile generator 520 may generate a first profile from a first corpus of a set of first user data.

The modified profile generator 525 may generate a set of modified profiles from a second profile from a second corpus of a set of second user data, where the first profile and the set of modified profiles includes respective sets of first and second attributes corresponding to one or both of text or metadata associated with the respective set of first and second user data.

The mathematical distance component 530 may determine a mathematical distance between the first profile and each modified profile of the set of modified profiles based on a comparison between the first set of attributes and the second set of attributes.

The profile selection component 535 may select a modified profile having a smallest determined mathematical distance.

The output module 540 may manage output signals for the apparatus 505. For example, the output module 540 may receive signals from other components of the apparatus 505, such as the datasets modifying manager 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
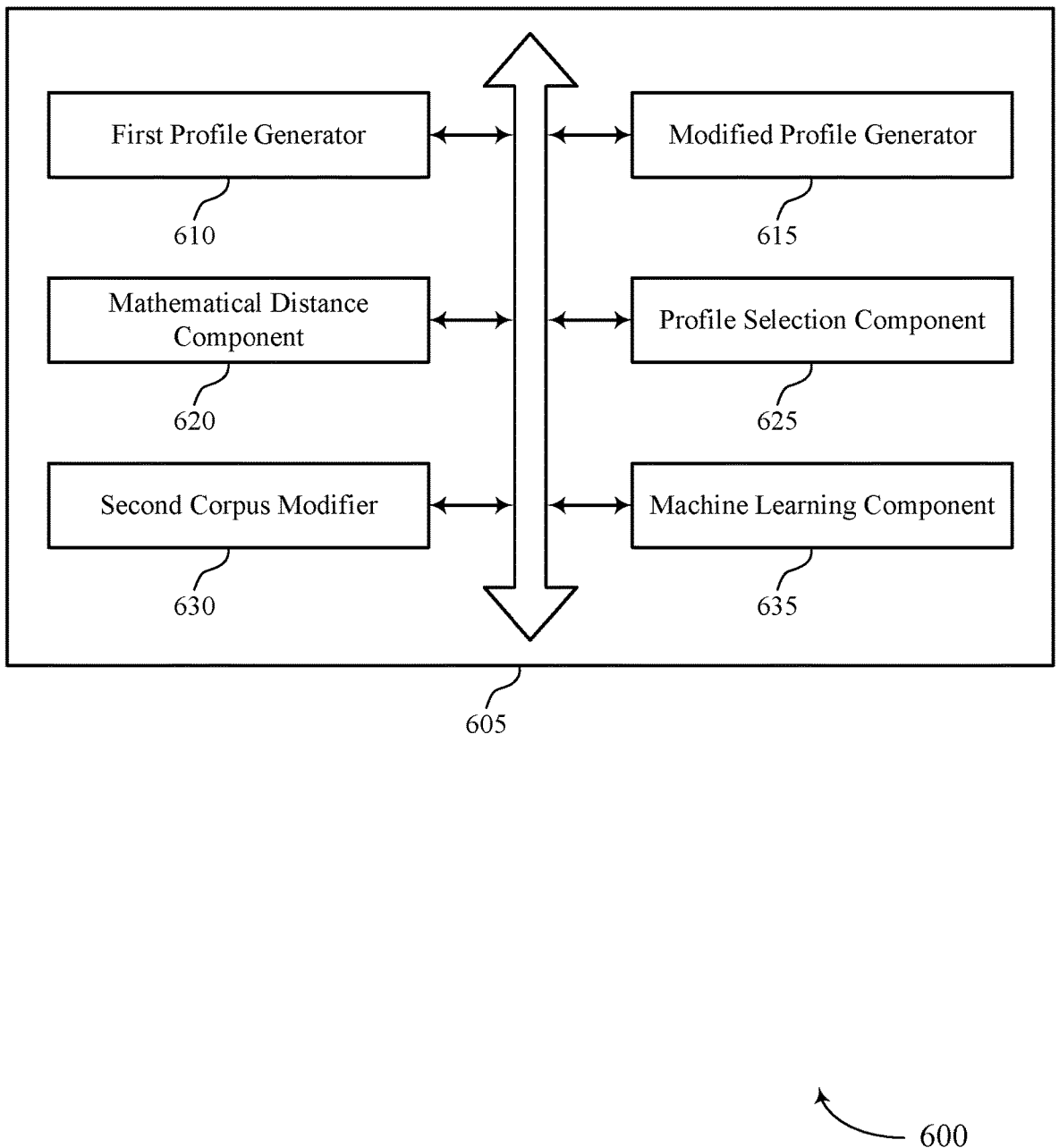
FIG. 6 shows a block diagram of a datasets modifying manager that supports modifications of user datasets to support statistical resemblance in accordance with aspects of the present disclosure.

FIG. 6 shows a block diagram 600 of a datasets modifying manager 605 that supports modifications of user datasets to support statistical resemblance in accordance with aspects of the present disclosure. The datasets modifying manager 605 may be an example of aspects of a datasets modifying manager 515 or a datasets modifying manager 710 described herein. The datasets modifying manager 605 may include a first profile generator 610, a modified profile generator 615, a mathematical distance component 620, a profile selection component 625, a second corpus modifier 630, and a machine learning component 635. Each of these modules may communicate, directly or indirectly, with one another (e.g., via one or more buses).

The first profile generator 610 may generate a first profile from a first corpus of a set of first user data.

In some examples, the first profile generator 610 may identify a group of text from each first user data of the set of first user data.

In some examples, the first profile generator 610 may generate a set of sequences of state transitions associated with the groups of text.

The modified profile generator 615 may generate a set of modified profiles from a second profile from a second corpus of a set of second user data, where the first profile and the set of modified profiles includes respective sets of first and second attributes corresponding to one or both of text or metadata associated with the respective set of first and second user data.

In some examples, the modified profile generator 615 may identify a subset of attribute patterns from the set of second user data having matching attribute patterns in the first profile.

In some examples, the modified profile generator 615 may retain the subset of attribute patterns unchanged in the set of modified profiles based on identifying the subset of attribute patterns.

In some examples, the modified profile generator 615 may generate a set of modified attributes for a remaining subset of attribute patterns by modifying at least one attribute of the set of second attributes.

In some examples, the modified profile generator 615 may generate a set of collapsed sequences by combining duplicate state transitions from each sequence of the set of sequences.

The mathematical distance component 620 may determine a mathematical distance between the first profile and each modified profile of the set of modified profiles based on a comparison between the first set of attributes and the second set of attributes.

In some examples, the mathematical distance component 620 may randomly sample from the set of modified attributes according to a distribution of occurrence of the set of modified attributes in the first profile.

In some cases, the first profile and the set of modified profiles include a distribution of occurrences of the respective first set of attributes and the second set of attributes.

In some cases, the respective first set of attributes and second set of attributes includes a sequence of state transitions, a distribution of lengths of a set of text communications, a frequency of an occurrence of one or more text combinations or metadata, or a combination thereof.

In some cases, the comparison between the first set of attributes and the second set of attributes is based on a probability weighted difference between occurrences of the first set of attributes in the first profile and occurrences of the second set of attributes in each modified profile of the set of modified profiles.

In some cases, a Manhattan distance, a Euclidean distance, a harmonic mean of a minimum distance, or a combination thereof.

In some cases, one or more of data logs, customer relationship management data, contact data, customer data, emails, calendar events, service tickets, short message service (SMS) text messages, voice calls, social media messages, or a combination thereof.

The profile selection component 625 may select a modified profile having a smallest determined mathematical distance.

The second corpus modifier 630 may modify the second corpus to generate the set of modified profiles.

In some cases, one or more of upsampling of the set of second user data of the second corpus, downsampling of the set of second user data of the second corpus, dropping elements from the second set of second user data of the second corpus, removing elements from the set of second user data of the second corpus, generating a vocabulary from the second set of second user data of the second corpus, generating one or more models from the second set of second user data of the second corpus, or a combination thereof.

The machine learning component 635 may train a machine learning model on the selected modified profile.

Figure 7:
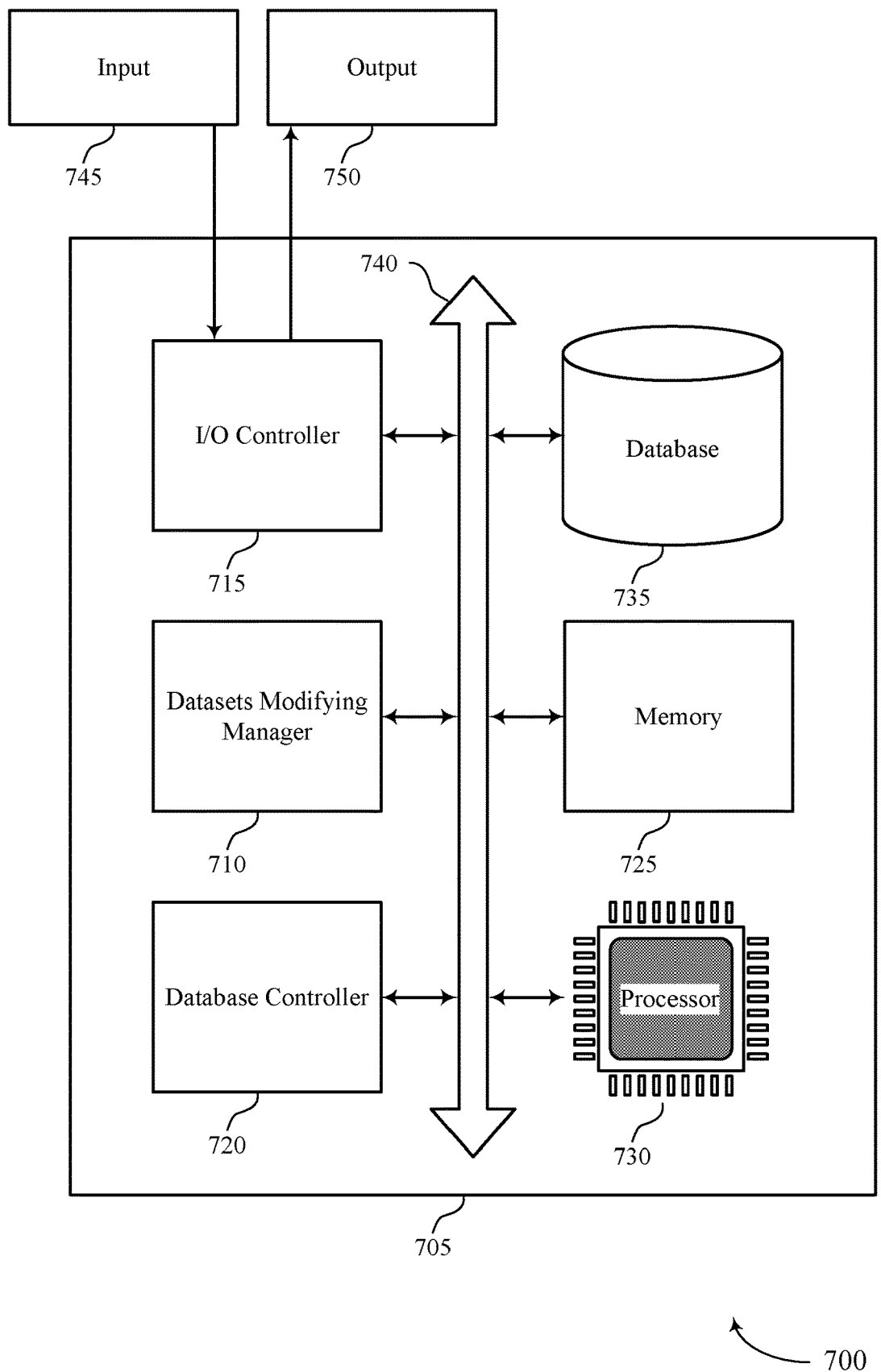
FIG. 7 shows a diagram of a system including a device that supports modifications of user datasets to support statistical resemblance in accordance with aspects of the present disclosure.

FIG. 7 shows a diagram of a system 700 including a device 705 that supports modifications of user datasets to support statistical resemblance in accordance with aspects of the present disclosure. The device 705 may be an example of or include the components of a database server or an apparatus 505 as described herein. The device 705 may include components for bi-directional data communications including components for transmitting and receiving communications, including a datasets modifying manager 710, an I/O controller 715, a database controller 720, memory 725, a processor 730, and a database 735. These components may be in electronic communication via one or more buses (e.g., bus 740).

The datasets modifying manager 710 may be an example of a datasets modifying manager 515 or 605 as described herein. For example, the datasets modifying manager 710 may perform any of the methods or processes described above with reference to FIGS. 5 and 6. In some cases, the datasets modifying manager 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting modifications of user datasets to support statistical resemblance).

Figure 8:
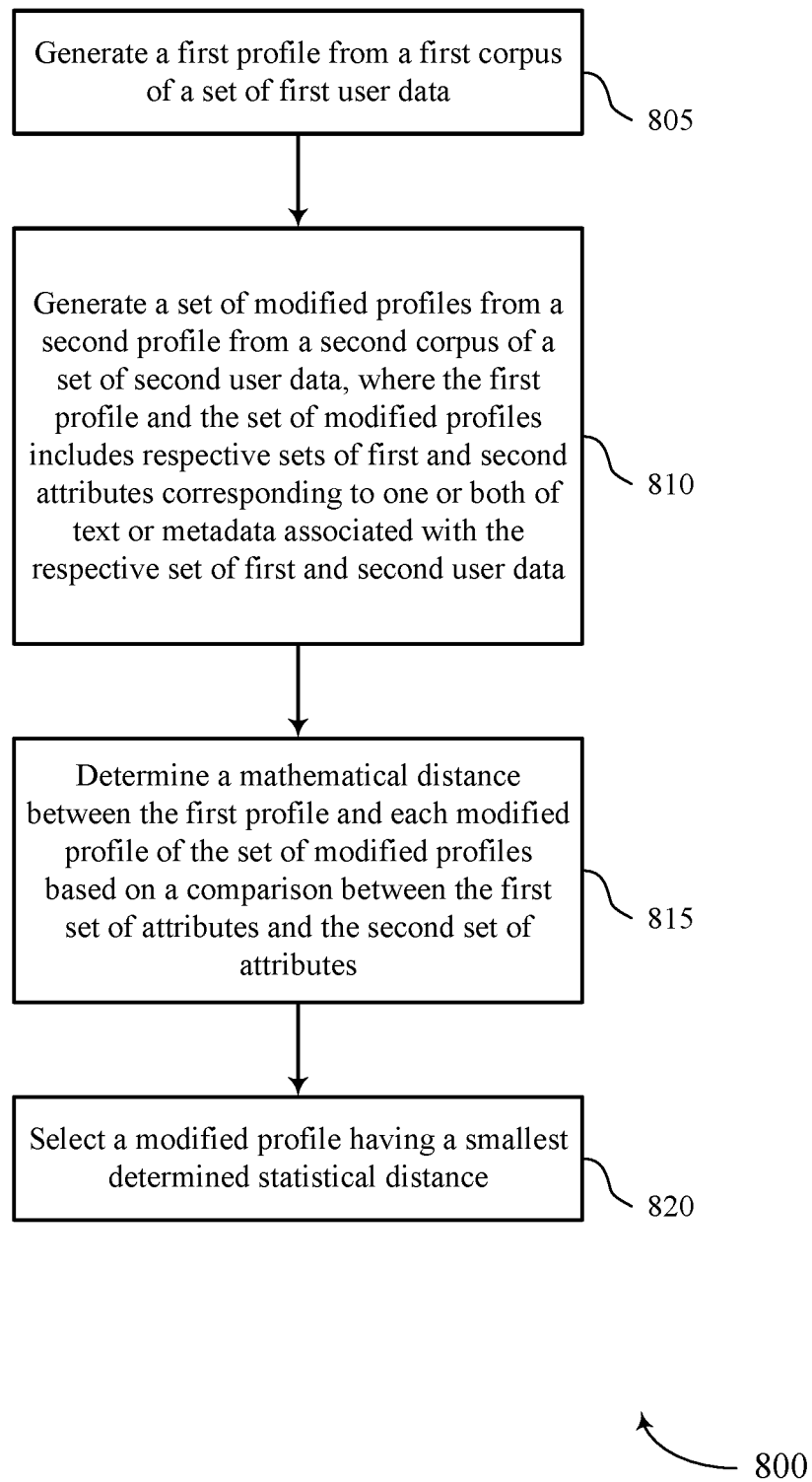
FIGS. 8 through 11 show flowcharts illustrating methods that support modifications of user datasets to support statistical resemblance in accordance with aspects of the present disclosure.

FIG. 8 shows a flowchart illustrating a method 800 that supports modifications of user datasets to support statistical resemblance in accordance with aspects of the present disclosure. The operations of method 800 may be implemented by a database server or its components as described herein. For example, the operations of method 800 may be performed by a datasets modifying manager as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 805, the database server may generate a first profile from a first corpus of a set of first user data. The operations of 805 may be performed according to the methods described herein. In some examples, aspects of the operations of 805 may be performed by a first profile generator as described with reference to FIGS. 5 through 7.

At 810, the database server may generate a set of modified profiles from a second profile from a second corpus of a set of second user data, where the first profile and the set of modified profiles includes respective sets of first and second attributes corresponding to one or both of text or metadata associated with the respective set of first and second user data. The operations of 810 may be performed according to the methods described herein. In some examples, aspects of the operations of 810 may be performed by a modified profile generator as described with reference to FIGS. 5 through 7.

At 815, the database server may determine a mathematical distance between the first profile and each modified profile of the set of modified profiles based on a comparison between the first set of attributes and the second set of attributes. The operations of 815 may be performed according to the methods described herein. In some examples, aspects of the operations of 815 may be performed by a mathematical distance component as described with reference to FIGS. 5 through 7.

At 820, the database server may select a modified profile having a smallest determined mathematical distance. The operations of 820 may be performed according to the methods described herein. In some examples, aspects of the operations of 820 may be performed by a profile selection component as described with reference to FIGS. 5 through 7.

Figure 9:
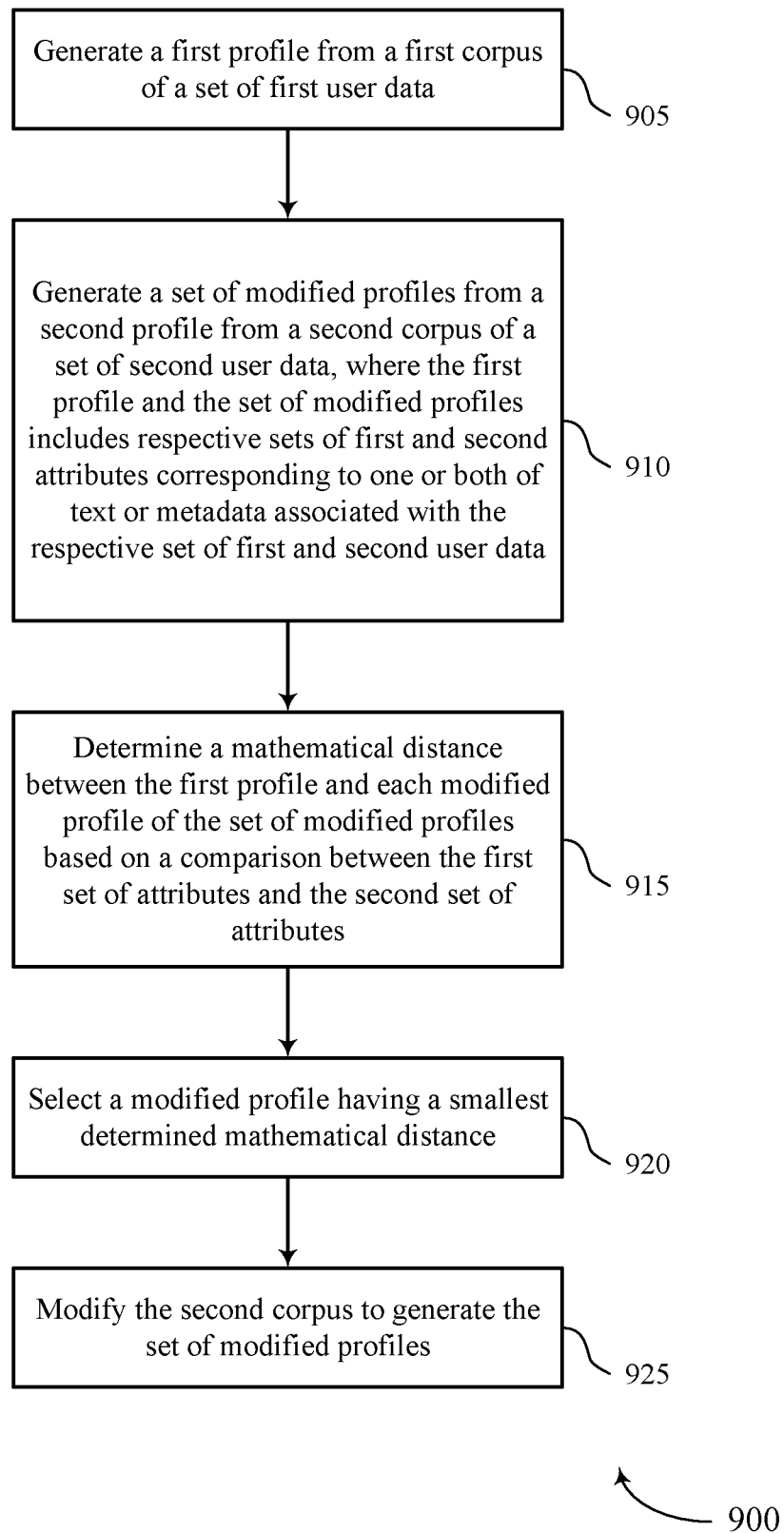

FIG. 9 shows a flowchart illustrating a method 900 that supports modifications of user datasets to support statistical resemblance in accordance with aspects of the present disclosure. The operations of method 900 may be implemented by a database server or its components as described herein. For example, the operations of method 900 may be performed by a datasets modifying manager as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 905, the database server may generate a first profile from a first corpus of a set of first user data. The operations of 905 may be performed according to the methods described herein. In some examples, aspects of the operations of 905 may be performed by a first profile generator as described with reference to FIGS. 5 through 7.

At 910, the database server may generate a set of modified profiles from a second profile from a second corpus of a set of second user data, where the first profile and the set of modified profiles includes respective sets of first and second attributes corresponding to one or both of text or metadata associated with the respective set of first and second user data. The operations of 910 may be performed according to the methods described herein. In some examples, aspects of the operations of 910 may be performed by a modified profile generator as described with reference to FIGS. 5 through 7.

At 915, the database server may determine a mathematical distance between the first profile and each modified profile of the set of modified profiles based on a comparison between the first set of attributes and the second set of attributes. The operations of 915 may be performed according to the methods described herein. In some examples, aspects of the operations of 915 may be performed by a mathematical distance component as described with reference to FIGS. 5 through 7.

At 920, the database server may select a modified profile having a smallest determined mathematical distance. The operations of 920 may be performed according to the methods described herein. In some examples, aspects of the operations of 920 may be performed by a profile selection component as described with reference to FIGS. 5 through 7.

At 925, the database server may modify the second corpus to generate the set of modified profiles. The operations of 925 may be performed according to the methods described herein. In some examples, aspects of the operations of 925 may be performed by a second corpus modifier as described with reference to FIGS. 5 through 7.

Figure 10:
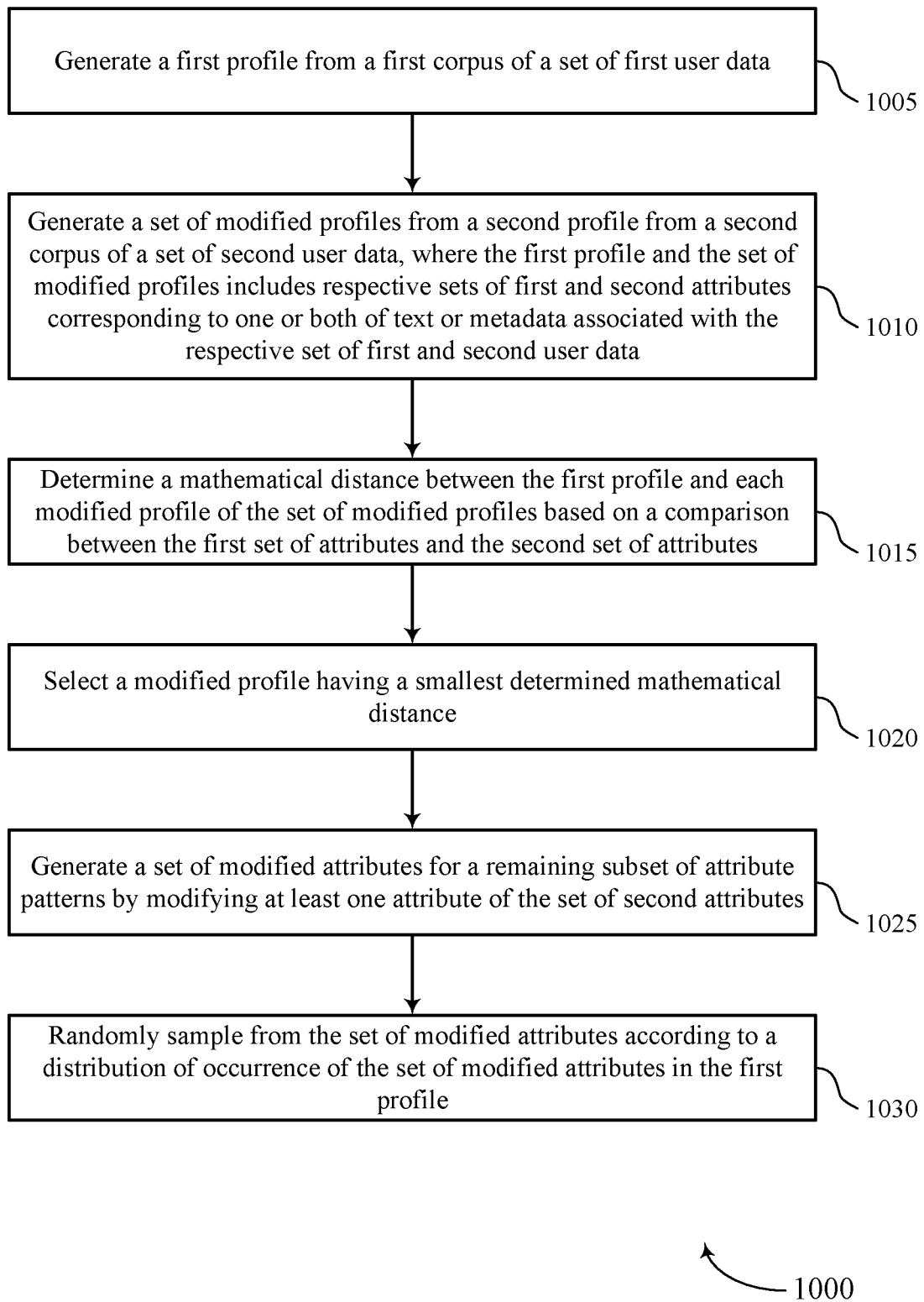

FIG. 10 shows a flowchart illustrating a method 1000 that supports modifications of user datasets to support statistical resemblance in accordance with aspects of the present disclosure. The operations of method 1000 may be implemented by a database server or its components as described herein. For example, the operations of method 1000 may be performed by a datasets modifying manager as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 1005, the database server may generate a first profile from a first corpus of a set of first user data. The operations of 1005 may be performed according to the methods described herein. In some examples, aspects of the operations of 1005 may be performed by a first profile generator as described with reference to FIGS. 5 through 7.

At 1010, the database server may generate a set of modified profiles from a second profile from a second corpus of a set of second user data, where the first profile and the set of modified profiles includes respective sets of first and second attributes corresponding to one or both of text or metadata associated with the respective set of first and second user data. The operations of 1010 may be performed according to the methods described herein. In some examples, aspects of the operations of 1010 may be performed by a modified profile generator as described with reference to FIGS. 5 through 7.

At 1015, the database server may determine a mathematical distance between the first profile and each modified profile of the set of modified profiles based on a comparison between the first set of attributes and the second set of attributes. The operations of 1015 may be performed according to the methods described herein. In some examples, aspects of the operations of 1015 may be performed by a mathematical distance component as described with reference to FIGS. 5 through 7.

At 1020, the database server may select a modified profile having a smallest determined mathematical distance. The operations of 1020 may be performed according to the methods described herein. In some examples, aspects of the operations of 1020 may be performed by a profile selection component as described with reference to FIGS. 5 through 7.

At 1025, the database server may generate a set of modified attributes for a remaining subset of attribute patterns by modifying at least one attribute of the set of second attributes. The operations of 1025 may be performed according to the methods described herein. In some examples, aspects of the operations of 1025 may be performed by a modified profile generator as described with reference to FIGS. 5 through 7.

At 1030, the database server may randomly sample from the set of modified attributes according to a distribution of occurrence of the set of modified attributes in the first profile. The operations of 1030 may be performed according to the methods described herein. In some examples, aspects of the operations of 1030 may be performed by a mathematical distance component as described with reference to FIGS. 5 through 7.

Figure 11:
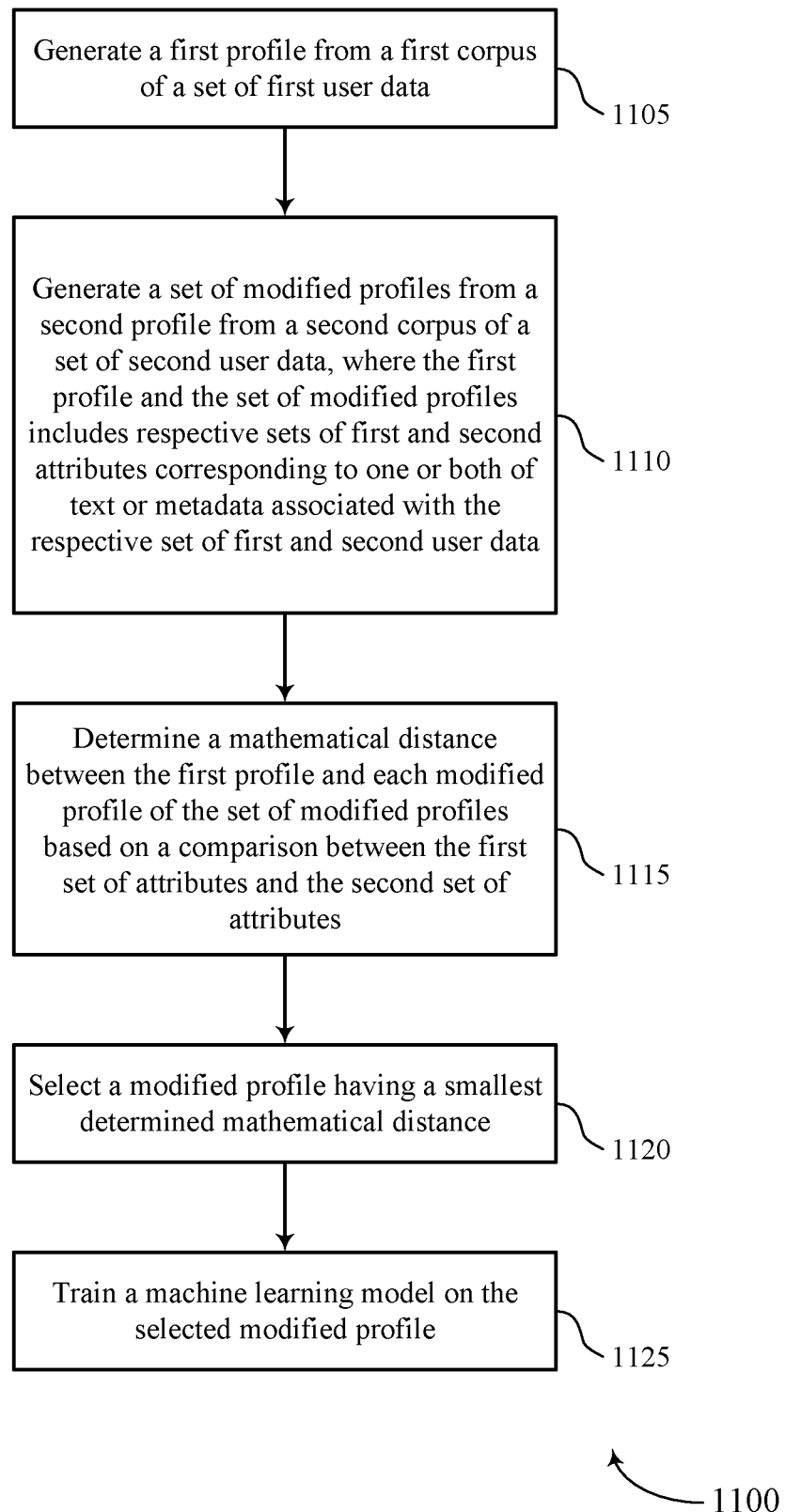

FIG. 11 shows a flowchart illustrating a method 1100 that supports modifications of user datasets to support statistical resemblance in accordance with aspects of the present disclosure. The operations of method 1100 may be implemented by a database server or its components as described herein. For example, the operations of method 1100 may be performed by a datasets modifying manager as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 1105, the database server may generate a first profile from a first corpus of a set of first user data. The operations of 1105 may be performed according to the methods described herein. In some examples, aspects of the operations of 1105 may be performed by a first profile generator as described with reference to FIGS. 5 through 7.

At 1110, the database server may generate a set of modified profiles from a second profile from a second corpus of a set of second user data, where the first profile and the set of modified profiles includes respective sets of first and second attributes corresponding to one or both of text or metadata associated with the respective set of first and second user data. The operations of 1110 may be performed according to the methods described herein. In some examples, aspects of the operations of 1110 may be performed by a modified profile generator as described with reference to FIGS. 5 through 7.

At 1115, the database server may determine a mathematical distance between the first profile and each modified profile of the set of modified profiles based on a comparison between the first set of attributes and the second set of attributes. The operations of 1115 may be performed according to the methods described herein. In some examples, aspects of the operations of 1115 may be performed by a mathematical distance component as described with reference to FIGS. 5 through 7.

At 1120, the database server may select a modified profile having a smallest determined mathematical distance. The operations of 1120 may be performed according to the methods described herein. In some examples, aspects of the operations of 1120 may be performed by a profile selection component as described with reference to FIGS. 5 through 7.

At 1125, the database server may train a machine learning model on the selected modified profile. The operations of 1125 may be performed according to the methods described herein. In some examples, aspects of the operations of 1125 may be performed by a machine learning component as described with reference to FIGS. 5 through 7.

A method of dataset modifying is described. The method may include generating a first profile from a first corpus of a set of first user data, generating a set of modified profiles from a second profile from a second corpus of a set of second user data, where the first profile and the set of modified profiles includes respective sets of first and second attributes corresponding to one or both of text or metadata associated with the respective set of first and second user data, determining a mathematical distance between the first profile and each modified profile of the set of modified profiles based on a comparison between the first set of attributes and the second set of attributes, and selecting a modified profile having a smallest determined mathematical distance.

An apparatus for dataset modifying is described. The apparatus may include a processor, memory coupled with the processor, and instructions stored in the memory. The instructions may be executable by the processor to cause the apparatus to generate a first profile from a first corpus of a set of first user data, generate a set of modified profiles from a second profile from a second corpus of a set of second user data, where the first profile and the set of modified profiles includes respective sets of first and second attributes corresponding to one or both of text or metadata associated with the respective set of first and second user data, determine a mathematical distance between the first profile and each modified profile of the set of modified profiles based on a comparison between the first set of attributes, and the second set of attributes, and select a modified profile having a smallest determined mathematical distance.

Another apparatus for dataset modifying is described. The apparatus may include means for generating a first profile from a first corpus of a set of first user data, generating a set of modified profiles from a second profile from a second corpus of a set of second user data, where the first profile and the set of modified profiles includes respective sets of first and second attributes corresponding to one or both of text or metadata associated with the respective set of first and second user data, determining a mathematical distance between the first profile and each modified profile of the set of modified profiles based on a comparison between the first set of attributes and the second set of attributes, and selecting a modified profile having a smallest determined mathematical distance.

A non-transitory computer-readable medium storing code for dataset modifying is described. The code may include instructions executable by a processor to generate a first profile from a first corpus of a set of first user data, generate a set of modified profiles from a second profile from a second corpus of a set of second user data, where the first profile and the set of modified profiles includes respective sets of first and second attributes corresponding to one or both of text or metadata associated with the respective set of first and second user data, determine a mathematical distance between the first profile and each modified profile of the set of modified profiles based on a comparison between the first set of attributes and the second set of attributes, and select a modified profile having a smallest determined mathematical distance.

In some examples of the method, apparatuses, and non-transitory computer-readable medium described herein, the first profile and the set of modified profiles include a distribution of occurrences of the respective first set of attributes and the second set of attributes.

In some examples of the method, apparatuses, and non-transitory computer-readable medium described herein, the respective first set of attributes and second set of attributes includes a sequence of state transitions, a distribution of lengths of a set of text communications, a frequency of an occurrence of one or more text combinations or metadata, or a combination thereof.

In some examples of the method, apparatuses, and non-transitory computer-readable medium described herein, the comparison between the first set of attributes and the second set of attributes may be based on a probability weighted difference between occurrences of the first set of attributes in the first profile and occurrences of the second set of attributes in each modified profile of the set of modified profiles.

Some examples of the method, apparatuses, and non-transitory computer-readable medium described herein may further include operations, features, means, or instructions for modifying the second corpus to generate the set of modified profiles.

In some examples of the method, apparatuses, and non-transitory computer-readable medium described herein, modifying the second corpus may include operations, features, means, or instructions for one or more of upsampling of the set of second user data of the second corpus, downsampling of the set of second user data of the second corpus, dropping elements from the second set of second user data of the second corpus, removing elements from the set of second user data of the second corpus, generating a vocabulary from the second set of second user data of the second corpus, generating one or more models from the second set of second user data of the second corpus, or a combination thereof.

In some examples of the method, apparatuses, and non-transitory computer-readable medium described herein, generating the set of modified profiles may include operations, features, means, or instructions for identifying a subset of attribute patterns from the set of second user data having matching attribute patterns in the first profile, and retaining the subset of attribute patterns unchanged in the set of modified profiles based on identifying the subset of attribute patterns.

Some examples of the method, apparatuses, and non-transitory computer-readable medium described herein may further include operations, features, means, or instructions for generating a set of modified attributes for a remaining subset of attribute patterns by modifying at least one attribute of the set of second attributes, and randomly sampling from the set of modified attributes according to a distribution of occurrence of the set of modified attributes in the first profile.

In some examples of the method, apparatuses, and non-transitory computer-readable medium described herein, generating the first profile may include operations, features, means, or instructions for identifying a group of text from each first user data of the set of first user data, and generating a set of sequences of state transitions associated with the groups of text.

Some examples of the method, apparatuses, and non-transitory computer-readable medium described herein may further include operations, features, means, or instructions for generating a set of collapsed sequences by combining duplicate state transitions from each sequence of the set of sequences.

In some examples of the method, apparatuses, and non-transitory computer-readable medium described herein, the mathematical distance may include operations, features, means, or instructions for a Manhattan distance, a Euclidean distance, a harmonic mean of a minimum distance, or a combination thereof.

In some examples of the method, apparatuses, and non-transitory computer-readable medium described herein, one or more of data logs, customer relationship management data, contact data, customer data, emails, calendar events, service tickets, short message service (SMS) text messages, voice calls, social media messages, or a combination thereof.

Some examples of the method, apparatuses, and non-transitory computer-readable medium described herein may further include operations, features, means, or instructions for training a machine learning model on the selected modified profile.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for dataset modification, comprising:
   generating a first profile from a first corpus of user data that comprises personally identifying information (PII), the first profile comprising a first set of attributes associated with the first corpus of user data and a probability of the first set of attributes occurring within the first corpus of user data;
   generating a plurality of profiles from different subsets of a second corpus of user data that does not include PII, the plurality of profiles comprising respective sets of attributes associated with the different subsets of the second corpus of user data and probabilities of the respective sets of attributes occurring within the different subsets of the second corpus of user data;
   modifying the plurality of profiles based at least in part on a weighted difference between the probability of the first set of attributes occurring within the first corpus of user data and the probabilities of the respective sets of attributes occurring within the different subsets of the second corpus of user data that does not include PII;
   selecting a second profile from the plurality of modified profiles based at least in part on the second profile satisfying a threshold with respect to the first profile; and
   using a subset of the second corpus of user data associated with the second profile as a corpus of training data for a machine learning model.

2. The method of claim 1, wherein:
   the first profile comprises a distribution of occurrences of the first set of attributes in the first corpus of user data; and
   the second profile comprises a distribution of occurrences of a second set of attributes in the second corpus of user data.

3. The method of claim 2, wherein:
   the first set of attributes comprises a sequence of state transitions, a distribution of lengths of a plurality of text communications, and a frequency of an occurrence of one or more text combinations or metadata from the first corpus of user data that includes PII; and
   the second set of attributes comprises a sequence of state transitions, a distribution of lengths of a plurality of text communications, and a frequency of an occurrence of one or more text combinations or metadata from the second corpus of user data that does not include PII.

4. The method of claim 2, further comprising:
   determining that the second profile satisfies the threshold with respect to the first profile based at least in part on a weighted difference between occurrences of the first set of attributes in the first profile and occurrences of a second set of attributes in the second profile.

5. The method of claim 1, further comprising:
   modifying the second corpus of user data to generate the plurality of profiles.

6. The method of claim 5, wherein modifying the second corpus comprises up-sampling user data in the second corpus, down-sampling user data in the second corpus, dropping elements from the second corpus, removing elements from the second corpus, generating a vocabulary from user data in the second corpus, generating one or more models from user data in the second corpus, or a combination thereof.

7. The method of claim 1, wherein modifying the second corpus comprises:
   identifying a subset of attribute patterns from the second corpus of user data that correspond to attribute patterns in the first profile; and
   retaining the subset of attribute patterns within the plurality of profiles based at least in part on identifying the subset of attribute patterns.

8. The method of claim 7, further comprising:
   generating a set of modified attributes for a remaining subset of attribute patterns by modifying at least one attribute from the respective sets of attributes; and
   randomly sampling the set of modified attributes from the second corpus of user data based at least in part on an occurrence distribution of corresponding attributes within the first profile.

9. The method of claim 1, wherein generating the first profile comprises:
   identifying text within communication messages of the first corpus of first user data; and
   generating one or more sequences of state transitions associated with the text.

10. The method of claim 9, further comprising:
    generating a set of collapsed sequences by combining duplicate state transitions from the one or more sequences of state transitions.

11. The method of claim 1, wherein the threshold is based at least in part on a Manhattan distance, a Euclidean distance, a harmonic mean of a minimum distance, or a combination thereof.

12. The method of claim 1, wherein the first corpus of user data and the second corpus of user data comprise data logs, customer relationship management data, contact data, customer data, emails, calendar events, service tickets, short message service (SMS) text messages, voice calls, social media messages, or a combination thereof.

13. The method of claim 1, wherein modifying the plurality of profiles comprises:

changing user data associated with the respective sets of attributes or modifying a number of attributes in the respective sets of attributes based at least in part on a pattern of attributes in the first profile.

14. An apparatus for dataset modification, comprising:
a processor,
memory coupled with the processor; and
instructions stored in the memory and executable by the processor to cause the apparatus to:
  generate a first profile from a first corpus of user data that comprises personally identifying information (PIT), the first profile comprising a first set of attributes associated with the first corpus of user data and a probability of the first set of attributes occurring within the first corpus of user data;
  generate a plurality of profiles from different subsets of a second corpus of user data that does not include PII, the plurality of profiles comprising respective sets of attributes associated with the different subsets of the second corpus of user data and probabilities of the respective sets of attributes occurring within the different subsets of the second corpus of user data;
  modify the plurality of profiles based at least in part on a weighted difference between the probability of the first set of attributes occurring within the first corpus of user data and the probabilities of the respective sets of attributes occurring within the different subsets of the second corpus of user data that does not include PII;
  select a second profile from the plurality of modified profiles based at least in part on the second profile satisfying a threshold with respect to the first profile; and
  use a subset of the second corpus of user data associated with the second profile as a corpus of training data for a machine learning model.

15. The apparatus of claim 14, wherein:
the first profile comprises a distribution of occurrences of the first set of attributes in the first corpus of user data; and
the second profile comprises a distribution of occurrences of a second set of attributes in the second corpus of user data.

16. The apparatus of claim 15, wherein:
the first set of attributes comprises a sequence of state transitions, a distribution of lengths of a plurality of text communications, and a frequency of an occurrence of one or more text combinations or metadata from the first corpus of user data that includes PII; and
the second set of attributes comprises a sequence of state transitions, a distribution of lengths of a plurality of text communications, and a frequency of an occurrence of one or more text combinations or metadata from the second corpus of user data that does not include PII.

17. The apparatus of claim 15, wherein the instructions are further executable by the processor to cause the apparatus to:
  determine that the second profile satisfies the threshold with respect to the first profile based at least in part on the weighted difference between occurrences of the first set of attributes in the first profile and occurrences of the second set of attributes in the second profile.

18. The apparatus of claim 14, wherein the instructions are further executable by the processor to cause the apparatus to:
  modify the second corpus of user data to generate the plurality of profiles.

19. The apparatus of claim 18, wherein, to modify the second corpus, the instructions are executable by the processor to cause the apparatus to up-sample user data in the second corpus, down-sample user data in the second corpus, drop elements from the second corpus, remove elements from the second corpus, generate a vocabulary from user data in the second corpus, generate one or more models from user data in the second corpus, or a combination thereof.

20. A non-transitory computer-readable medium storing code for dataset modification, the code comprising instructions executable by a processor to:
  generate a first profile from a first corpus of user data that comprises personally identifying information (PII), the first profile comprising a first set of attributes associated with the first corpus of user data and a probability of the first set of attributes occurring within the first corpus of user data;
  generate a plurality of profiles from different subsets of a second corpus of user data that does not include PIT, the plurality of profiles comprising respective sets of attributes associated with the different subsets of the second corpus of user data and probabilities of the respective sets of attributes occurring within the different subsets of the second corpus of user data;
  modify the plurality of profiles based at least in part on a weighted difference between the probability of the first set of attributes occurring within the first corpus of user data and the probabilities of the respective sets of attributes occurring within the different subsets of the second corpus of user data that does not include PII;
  select a second profile from the plurality of modified profiles based at least in part on the second profile satisfying a threshold with respect to the first profile; and
  use a subset of the second corpus of user data associated with the second profile as a corpus of training data for a machine learning model.

* * * * *